United States Patent [19]

Rieder et al.

[11] Patent Number: 4,716,292
[45] Date of Patent: Dec. 29, 1987

[54] LINEAR INCREMENTAL MEASURING SYSTEM FOR MEASURING SPEED AND DISPLACEMENT

[75] Inventors: Heinz Rieder, St. Pantaleon; Max Schwaiger, Ostermiething, both of Austria

[73] Assignee: RSF-Elektronik Gesellschaft m.b.H., Tarsdorf, Austria

[21] Appl. No.: 750,859

[22] Filed: Jul. 1, 1985

[30] Foreign Application Priority Data

Jul. 6, 1984 [AT] Austria ................................ 2174/84

[51] Int. Cl.⁴ .......................................... G01D 5/34
[52] U.S. Cl. ......................... 250/237 G; 250/231 SE; 340/341 P
[58] Field of Search ................... 324/175; 340/347 P; 356/395; 250/237 G, 231 SE

[56] References Cited
U.S. PATENT DOCUMENTS 3,631,443 12/1971 Halfhill ................................. 324/175
3,811,091 5/1974 Ha et al. ................................ 324/175
4,306,220 12/1981 Schwefel et al. ............... 250/237 G
4,529,964 7/1985 Minami et al. .................. 250/237 G
4,614,869 9/1986 Hoshino et al. ............... 250/231 SE Primary Examiner—Edward P. Westin
Assistant Examiner—Charles F. Wieland
Attorney, Agent, or Firm—Karl F. Ross; Herbert Dubno; Ronald Lianides

[57] ABSTRACT

The linear incremental measuring system comprises an incremental scale, a scanning unit for generating two analog signals, which are displaced in phase in a direction depending on the direction of the scanning movement, and a processor for generating digital signals from the analog signals and for delivering said digital signals to a bidirectional counter, which is used to control a display device and/or a control device. In order to detect in a simple manner the velocity of the scanning movement relative to the scale and to generate a voltage that is proportional to that velocity and can be used to control a machine, digital signals derived from the analog signals are delivered to a digital-to-analog conversion circuit, which delivers an analog voltage that is proportional to the velocity of the scanning movement and has a polarity that is dependent on the direction of that movement.

3 Claims, 1 Drawing Figure

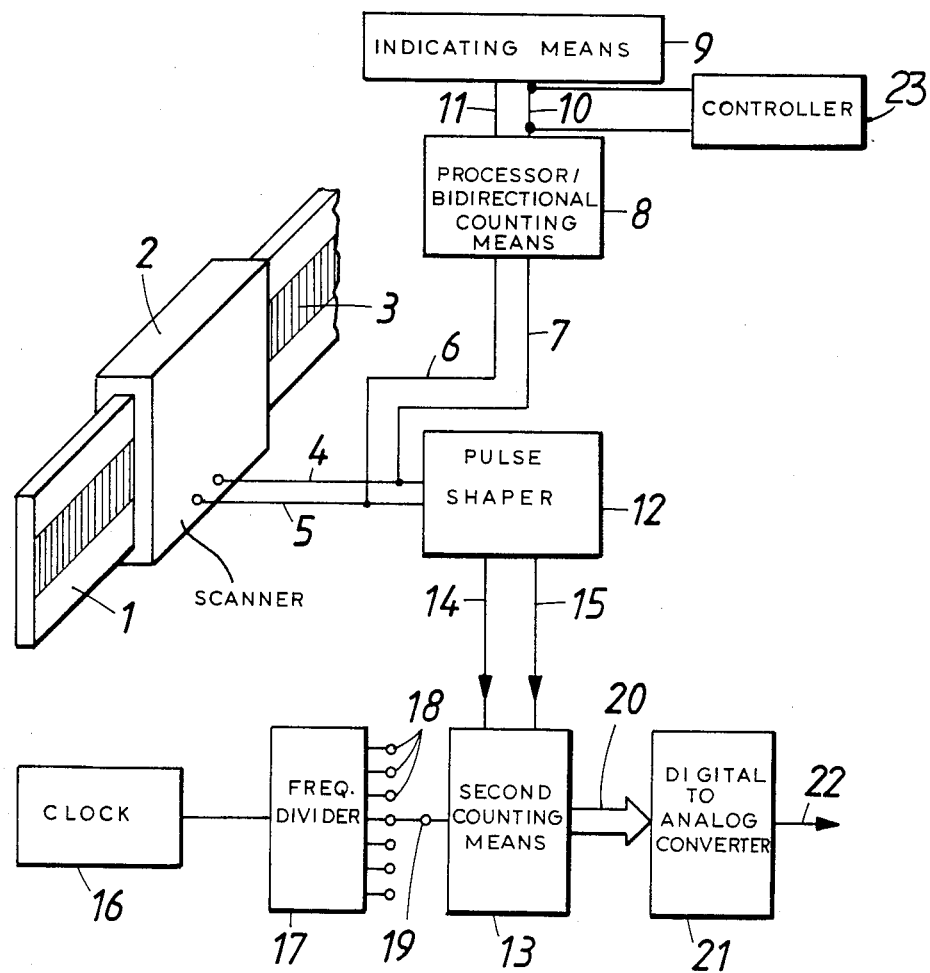

LINEAR INCREMENTAL MEASURING SYSTEM FOR MEASURING SPEED AND DISPLACEMENT

FIELD OF THE INVENTION

This invention relates to a linear incremental measuring system comprising a linear incremental scale, a scanning unit for generating two analog signals, which are displaced in phase in a sense depending on the direction of the scanning movement of the scanning unit relative to the scale, and a processor for generating digital signals, which are delivered to a biderectional counter, which controls an indicating and/or control device.

BACKGROUND OF THE INVENTION

In incremental measuring systems, a scale can be scanned in an optoelectronic or inductive or magnetic or capacitive process, in dependence on the nature of the scale and of the scanning unit. In most cases the scanning results in the generation of basically sinusoidal analog signals, in which a complete signal period is associated with a complete increment of the scale. For an optoelectronic scanning, each complete scale increment comprises a bright field and a dark field and in the simplest case a graduation line and an empty field or free space. In the present case the term "linear incremental measuring system" is used to describe also absolute measuring systems having a plurality of coded scale tracks including an incremental scale track having the highest resolution. In most known linear measuring systems of the present kind, the scanning results in the generation of at least two analog signals which are displaced in phase e.g., by 90°, in dependence on the direction of the scanning movement performed by the scanning unit relative to the scale, one of the signals leading the other signal so that the direction of the scanning movement can be detected from the analog signals by a direction discriminator. The analog signals are processed in a processor, which generates digital signals which can be counted. In the simplest case, binary square-wave signals are derived from the zero crossings of the phase-displaced signals by a trigger and are delivered to a bidirectional counter, which is supplied from the direction discriminator with direction-indicating signals indicating the instantaneous direction of the scanning movement and which increases or decreases its count in dependence on that direction. The count of the bidirectional counter indicates the distance of the scanning unit from a zero point, which has been selected or which is defined by a reference mark on the scale. In other embodiments, a separate counter is associated with each direction of the scanning movement and is supplied with those digital signals which indicated a movement in that direction. In the latter case the resulting count is derived from the counts of the two counters by a computation, in most cases by means of a computer. The usual scale divisions and the above-described "direct" processing of the analog signals permit resolution of an order of a hundreth of a millimeter. Such a resolution is the coarsest resolution of the usual linear incremental measuring systm. A number of known methods and circuit arrangements can be adopted to dervie intermediate values from the signals obtained by the measurement in that the increment of an order of one hundreth of a millimeter is electronically subdivided. This may be accomplishedd e.g., by potentiometer circuit and interpolating computers. Such circuits deliver digital signals. In the prior art, a resolution of an order of 1 micrometer is common and a resolution of 0.1 micrometer can be achieved.

In numerous applications of incremental linear measuring systems it is desired to ascertain the instantaneous velocity of the scanning movement in addition to the position of or the distance travelled by the scanning unit, inter alia, in path control systems, machine tools and robots which are provided with incremental linear measuring systems. It is known that the velocity of parts can be ascertained by means of tachometer generators connected to the corresponding drive systems and generating a d.c. voltage, which substantially corresonds to the instantaneous velocity and has a polarity which depends on the sense of rotation. In that case, separate tachometer generators are required for a measurement of velocity. The actual velocity of a member which is driven by a motor to perform a linear movement e.g., a tool slide, must be derived or computed from the information which indicates the rotary speed of the motor. Additional complications are introduced by possibly interposed mechanical transmissions and the slip involved in most cases in the transmission of power from the motor to the driven member, which usually cannot be taken ino account or can be taken into account only in part.

Systems other than tachometer generators can be used to ascertain rotary speeds, angular movements and angular velocities of a motor. For this purpose a magnetic pulse generator connected to the motor comprises a disc carrying a plurality of angularly spaced apart magnets, which are moved past a stationary sensor so that voltages depending on the position of the disc are induced in the sensor. The voltages can be converted to digital signals. In such arrangements the rotary speed, the angular movement and the angular velocity can be digitally indicated or ascertained or an analog display can be obtained in that the digital signals are transformed by a suitable digital-to-analog converter. Such measuring system will have a much coarser resolution than the linear measuring systems of the kind discussed here. Small angular movements and low angular velocities cannot be indicated accurately and such systems also have the basic disavantage that the linear velocity must be derived from the motor speed by a computation and basic errors which are due to slippage or to computation errors may also occur. Moreover, the use of such arrangements in combination with a linear measuring system has not been contemplated before and such a combination would be very expensive.

OBJECT OF THE INVENTION

It is an object of the invention to provide a system which is of the kind described first hereinbefore and in which information on the instantaneous velocity of the scanning movement can be obtained and corresponding signals can be generated and processed with a simple means and without a substantial increase of the circuitry expenditure.

SUMMARY OF THE INVENTION

This object is accomplished in that digital signals derived from the analog signals are supplied to a digital-to-analog conversion circuit for generating an analog voltage which is proportional to the velocity of the scanning movement and has a polarity depending on the direction of the scanning movement.

In the arrangement in accordance with the invention there is no need for an additional tachometer generator or another measuring device for indicating the angular velocity of the motor. The analog voltage which is generated is proportional to the actual velocity of the member which performs a linear movement. If that member consists of a tool slide, the actual velocity will not be determined in dependence on the rotary speed or angular velocity of the drive motor but will be measured directly. Another advantage resides in that such values of the parameters may be selected so that the velocity-indicating analog voltage will vary in a range which meets the requirements of the control system or other arrangement supplied with that voltage. Because linear incremental measuring systems have a high resolution, the rate at which velocity-indicating signals are generated even during a slow scanning movement will be sufficient for the generation of an analog voltage which is proportional to the low velocity and which has a polarity which depends on the direction of the scanning movement. As a result, exact indications regarding the velocity and direction of the scanning movement will be otained even if the scanning movement is performed at a low velocity. On the other hand, the voltage generated by the previously employed tachometer generators at low rotary speeds is not sufficient and is not proportional to a sufficiently proportional voltage and can be generated by the above-described synchro transmitters only in highly expensive systems. Only a very small additional expenditure is involved in the linear incremental measuring system which embodies the present invention.

In a preferred embodiment, the digital-to-analog conversion circuit comprises a bidirectional counter and a digital-to-analog converter for periodically sampling and resetting the count of that counter under the control of a clock.

The invention is preferably applied to a linear measuring system comprising an incremental scale which is optoelectronically scanned.

BRIEF DESCRIPTION OF THE DRAWING

The sole FIGURE of drawing is a block circuit diagram showing a linear incremental measuring system which embodies the invention.

SPECIFIC DESCRIPTION

A scanning unit 2 is movable along a rule 1, which is provided with an incremental scale 3. In the present embodiment the scanning unit 2 generates two analog voltage signals, which are basically sinusoidal and displaced in phase relative to each other. The wavelength of the voltage signals equals the pitch of the incremental scale 3. An optoelectronic scanning may be effected with transmitted or reflected light. In most cases, the scanning unit 2 comprises gratings, which are offset relative to each other along the scale 3 by fractional parts of a scale increment, and photodetectors disposed behind the gratings and illuminated by light transmitted through the scale 3 and the gratings in a known manner. The analog voltage signals generated by the photodetectors are delivered to lines 4, 5, which are connected by branch lines 6, 7 to a processor 8, which in dependence on the analog voltage signals generates digital signals and direction-indicating signals. The digital signals and the direction-indicating signals are used to control bidirectional counting means formed by a bidirectional counter, which is integrated in the processor 8 and via lines 10 and 11 delivers information indicating the distance travelled by the scanning unit 2 or its position to indicating means formed by a display unit 9 and possibly also to a controller 23 for controlling a machine. The information displayed by the display unit 9 may indicate, e.g., the distance from the scanning unit 2 to a fixed or selected zero point on the rule 1. Branch lines may extend from the lines 10, 11 to the controller 23. The arrangement described thus far is conventional in linear incremental measuring systems.

In the present embodiment, a circuit for generating a velocity-indicating analog voltage that is proportional to the instantaneous velocity of the movement of the scanning unit 2 relative to the rule 1 comprises a pulse-shaping circuit 12 for generating digital signals. Alternatively, the signals required for the generation of the velocity-indicating analog voltage may be branched off behind a common pulse-shaping stage, which delivers signals to be utilized in the processor 8 and in the circuit additionally provided in accordance with the invention. Direction-indicating signals indicating the direction of movement and digital signals derived from the analog signals in the lines 4, 5 are delivered by the pulse-shaping stage 12 via lines 14, 15 to second counting means formed by a bidirectional counter 13.

Clock oscillator means comprising a clock 16 supplies clock signals to a programmable frequency divider stage 17, which has a plurality of outputs 18 corresponding to different frequency ratios. That output 18 which corresponds to the desired frequency ratio is connected to an input 19 of the counter 13. The counter 13 includes an electronic change-over switch, which under the control of the clock signal from the clock 16 causes the digital signals applied to the input 19 to be delivered to a reset input and a latch input of the counter 13 in alternate clock periods. At the end of each clock period in which the digital signals are delivered to the latch input, the count of the counter is sampled via a line 20 by a digital-to-analog converter 21 comprising a digital-to-analog conversion circuit, which receives also the direction-indicating signals indicating the direction of movement and which delivers to its output line 22 a voltage which is proportional to the velocity of the scanning unit 2 and has a polarity that depends on the direction of movement thereof. A signal delivered to the rest input of the counter 13 resets that counter to zero. The number of pulses consecutively delivered to the latch input of the counter 13 during a clock period is directly proportional to the velocity of the movement of the scanning unit 2 relative to the scale 3. The voltage applied to the line 22 may be utilized in a control system of a machine. For instance, in a machine tool this voltage may indicate the velocity of a tool or of a workpiece moving along the scale.

We claim:

1. A linear measuring system, comprising:
a linear incremental scale;
a scanning unit displaceable in a scanning movement along said scale for generating two phase-displaced analog signals in response to said scanning movement, a direction of phase displacement of said analog signals representing direction of said scanning movement;
a processor connected to said scanning unit and receiving said analog signals therefrom for generating digital signals representing said analog signals and for simultaneously generating direction-indicating signals;

bidirectional counting means connected to said processor and receiving said digital signals therefrom for counting said digital signals and generating a count related to the extent of said scanning movement and receiving direction-indicating signals from said processor so that the direction of counting by said counter represents the direction of said scanning movement;

indicating means connected to said counting means for providing a display of said extent of said scanning movement;

a digital-to-analog conversion circuit connected to said processor and receiving said digital signals therefrom for converting said digital signals to an analog output proportional to the velocity of said scanning movement and with a polarity which depends upon the direction of said scanning movement, said digital-to-analog conversion circuit comprising:

second counting means for receiving digital signals from said processor and for counting said digital signals, a digital-to-analog converter for sampling the count of said second counting means and for deriving from the count thus sampled an analog voltage having under the control of said direction-indicating signals a polarity depending on the instantaneous direction of said scanning movement, and means comprising a clock effecting a sampling of the count of said second counting means by said digital-to-analog coverter and a resetting of said second counting means during alternate periods defined by said clock wherein said second counting means being bidirectional counting means for counting said digital signals from said processor in a sense depending on the concurrently generated direction-indicating signals.

2. A linear measuring system, comprising:

a linear incremental scale; a scanning unit displaceable in a scanning movement along said scale for generating two phase-displaced analog signals in response to said scanning movement, a direction of phase displacement of said analog signals representing direction of said scanning movement;

a processor connected to said scanning unit and receiving said analog signals therefrom for generating digital signals representing said analog signals and for simultaneously generating direction-indicating signals;

bidirectional counting means connected to said processor and receiving said digital signals therefrom for counting said digital signals and generating a count related to the extent of said scanning movement and receiving direction-indicating signals from said processor so that the direction of counting by said counter represents the direction of said scanning movement;

indicating means connected to said counting means for providing a display of said extent of said scanning movement; and a digital-to-analog conversion circuit connected to said proceessor and receiving said digital signals therefrom for converting said digital signals to an analog output proportional to the velocity of said scanning movement and with a polarity which depends upon the direction of said scanning movement said digital-to-analog conversion circuit comprising:

second counting means for receiving digital signals from said processor, a digital-to-analog converter for sampling the count of said second counting means and for deriving an analog voltage from the count thus sampled, and means comprising a clock effecting a sampling of the count of said second counting means by said digital-to-analog converter and a resetting of said second counting means during alternate periods defined by said clock.

3. The linear measurement system defined in claim 1 which is a measuring system in which said scale is an incremental scale and said scanning unit comprises optoelectronic means for scanning said scale.

* * * * *